(12) United States Patent
Daskon Herath Mudiyanselage et al.

(10) Patent No.: US 12,192,205 B2
(45) Date of Patent: Jan. 7, 2025

(54) UTILIZING PROBABILITY DATA STRUCTURES TO IMPROVE ACCESS CONTROL OF DOCUMENTS ACROSS GEOGRAPHIC REGIONS

(71) Applicant: Microsoft Technology Licensing, LLC, Redmond, WA (US)

(72) Inventors: Charitha Herath Daskon Herath Mudiyanselage, Oslo (NO); Kaare Koehler Hoevik, Porsgrunn (NO); Åge Andre Kvalnes, Fetsund (NO); Tor Kreutzer, Tromsø (NO); Mohamed Azmil Macksood, Oslo (NO)

(73) Assignee: Microsoft Technology Licensing, LLC, Redmond, WA (US)

( * ) Notice: Subject to any disclaimer, the term of this patent is extended or adjusted under 35 U.S.C. 154(b) by 370 days.

(21) Appl. No.: 17/848,896

(22) Filed: Jun. 24, 2022

(65) Prior Publication Data
US 2023/0421559 A1 Dec. 28, 2023

(51) Int. Cl.
*H04L 9/40* (2022.01)
*G06N 7/01* (2023.01)

(52) U.S. Cl.
CPC ............. *H04L 63/101* (2013.01); *G06N 7/01* (2023.01)

(58) Field of Classification Search
CPC .................................................. H04L 63/107
See application file for complete search history.

(56) References Cited

U.S. PATENT DOCUMENTS 8,554,753 B1 * 10/2013 Bullock .............. G06F 16/2455
707/703
9,189,496 B2 * 11/2015 Egnor ................. G06F 16/9537
(Continued)

FOREIGN PATENT DOCUMENTS

CA    2997922 A1 *  3/2017  ......... G06F 16/2255
CN  103078926 A  *  5/2013
(Continued)

OTHER PUBLICATIONS

Author Unknown, "Morton Filter-Based Security Mechanism for Healthcare System in Cloud Computing", Healthcare, Publication Date: Nov. 15, 2021 (Year: 2021).*
(Continued)

*Primary Examiner* — Carl G Colin
*Assistant Examiner* — Habibullah
(74) *Attorney, Agent, or Firm* — Ray Quinney & Nebeker; Chris Hallstrom

(57) ABSTRACT

The present disclosure relates to systems, methods, and computer-readable media for utilizing a content access authorization system to determine user access control efficiently and flexibly for digital documents that are stored in different geographic regions. For instance, the content access authorization system can convert sensitive user information for digital documents stored in a first geographic region into a probabilistic data structure that does not include user information and share the probabilistic data structure with a second geographic region. The content access authorization system can then utilize the probabilistic data structure to efficiently pre-filter user document access control for digital documents requested by a user in the second geographic region that are stored in the first geographic region, which significantly saves on latency and computing resource usage by reducing the number of docu- (Continued)

ment control access queries needed to be made to the first geographic region.

20 Claims, 10 Drawing Sheets

(56) References Cited

U.S. PATENT DOCUMENTS

| | | | |
|---|---|---|---|
| 9,904,602 B1 | 2/2018 | Auchmoody et al. | |
| 9,967,236 B1* | 5/2018 | Ashley | H04L 63/20 |
| 10,051,001 B1* | 8/2018 | Ashley | H04L 63/083 |
| 10,075,510 B2* | 9/2018 | Reilly | H04L 67/10 |
| 10,084,877 B2* | 9/2018 | Hipsh | H04L 67/5681 |
| 10,223,393 B1* | 3/2019 | Noble | H04L 67/1097 |
| 10,298,610 B2 | 5/2019 | Ashley et al. | |
| 10,536,465 B2 | 1/2020 | Sommerfelt et al. | |
| 10,650,003 B1* | 5/2020 | Rubin | G06F 16/24573 |
| 11,216,581 B1* | 1/2022 | Arikapudi | G06F 21/6227 |
| 11,308,123 B2* | 4/2022 | Acheson | G06F 16/2379 |
| 11,403,269 B2* | 8/2022 | Cheru | G06F 16/2474 |
| 11,709,845 B2* | 7/2023 | Solheim | G06F 16/182 |
| | | | 707/722 |
| 2006/0161966 A1* | 7/2006 | Nagampalli | H04L 63/1408 |
| | | | 726/1 |
| 2011/0252033 A1* | 10/2011 | Narang | G06F 16/325 |
| | | | 707/E17.089 |
| 2012/0078643 A1* | 3/2012 | Nagpal | G06Q 30/02 |
| | | | 707/812 |
| 2013/0226837 A1* | 8/2013 | Lymberopoulos | |
| | | | G06F 16/9574 |
| | | | 706/12 |
| 2013/0275765 A1* | 10/2013 | Lay | G06F 21/6218 |
| | | | 713/189 |
| 2014/0156793 A1* | 6/2014 | Chan | G06F 16/93 |
| | | | 709/217 |
| 2015/0150075 A1* | 5/2015 | Vahlis | G06F 16/245 |
| | | | 726/1 |
| 2018/0205739 A1* | 7/2018 | Sommerfelt | G06F 21/6218 |
| 2019/0116238 A1* | 4/2019 | Bernard | H04L 67/568 |
| 2019/0313224 A1* | 10/2019 | Yu | H04L 67/12 |
| 2020/0195719 A1* | 6/2020 | Mehta | H04L 67/1097 |
| 2021/0344755 A1* | 11/2021 | Mehta | H04L 67/1078 |
| 2022/0027498 A1 | 1/2022 | Vandanapu | |
| 2022/0277340 A1* | 9/2022 | Sheppard | G06Q 30/0246 |
| 2022/0300630 A1* | 9/2022 | Singh | G06F 21/6218 |
| 2023/0034392 A1* | 2/2023 | Adavi | G06Q 30/0204 |
| 2023/0102392 A1* | 3/2023 | Nomura | G06F 3/067 |
| | | | 711/154 |
| 2023/0143933 A1* | 5/2023 | Wang | G06F 21/6254 |
| | | | 726/1 |
| 2023/0306109 A1* | 9/2023 | Lowenhardt | G06F 11/3072 |

FOREIGN PATENT DOCUMENTS

| | | | | |
|---|---|---|---|---|
| CN | 112562151 A | | 3/2021 | |
| CN | 112532598 B | | 10/2021 | |
| EP | 3876127 A1 * | | 9/2021 | G06F 21/335 |
| WO | WO-2023049644 A1 * | | 3/2023 | G06F 21/6227 |

OTHER PUBLICATIONS

Authors: Jarkko Tolvanen, Tapio Suihko, Jaakko Lipasti, and N. Asokan, "Remote Storage for Mobile Devices", 2006 IEEE, Manuscript received: Jun. 23, 2005. (Year: 2005).*
"International Search Report and Written Opinion Issued in PCT Application No. PCT/US23/021626", Mailed Date: Aug. 18, 2023, 15 Pages.
Anandam, et al., "Network Access Control Using Bloom Filters", Retrieved from: https://courses.cs.washington.edu/courses/csep521/07wi/prj/parvez.pdf, Mar. 12, 2007, pp. 1-6.

* cited by examiner

UTILIZING PROBABILITY DATA STRUCTURES TO IMPROVE ACCESS CONTROL OF DOCUMENTS ACROSS GEOGRAPHIC REGIONS

BACKGROUND

Recent years have seen significant advancements in both hardware and software with respect to accessing, managing, and sharing digital content. For instance, modern computing systems allow users to identify, access, and utilize digital content as well as share digital content items with other users. As an example, modern computing systems facilitate users from different parts of the world to collaborate on the same digital content item. For example, a team of users (e.g., from the same organization or company) that are spread across multiple countries can work together on shared pieces of digital content.

Previously, to facilitate sharing digital content across different geographic regions, existing computing systems would store copies of the shared digital content in local data centers near each of the users. In this manner, the existing computing systems could retrieve a digital content item from a local data center more quickly than retrieving it from a remote data center located much further away. For example, if a first user in Norway shares a digital content item with a second user in India, existing computing systems would store copies of the digital content item near both users.

Recent changes to data handling standards (DHS) and privacy laws now prevent user information from being shared across particular countries and regions without user authorization. In many instances, this results in existing computing systems inflexibly not being able to store copies of access control blocks for digital content in each region as access control blocks include sensitive information about users who have access to the digital content. Accordingly, because of these and other changes, existing computing systems are no longer able to store local copies of digital content or associated information (e.g., access control blocks) in data centers across different geographic regions.

Currently, for a user to access digital content stored in a different region, existing computing systems often must send a request (e.g., calls) for each digital content item to the region where the digital content is stored to first determine if the user has permission to access the file and, if so, retrieve the contents of the digital content. These calls to obtain access control information and verify which users have access to digital content for each digital content item inefficiently cause a significant impact on latency and resource usage. Moreover, in addition to the latency needed to route a call around the world and back, calls for each digital content item inefficiently use valuable network and computing resources along the way.

Additionally, with the number of digital content items being shared among users increasing along with the rise of performing digital content automations (e.g., automations based on analyzing multiple digital content items associated with a user), existing computing systems are further limited in their ability to determine and access digital content items for a user. In particular, many existing computing systems are rigidly impeded from efficiently providing digital content automations to users due to the burden of needing to send calls across the world for each potential digital content item. Indeed, for existing computer systems to check digital content access rights for a user against a list of n digital content items stored remotely (e.g., the list of items being identified as part of an automation), these existing computer systems must perform n calls to one or more remote geographic regions.

These and other problems result in significant inflexibilities and inefficiencies of existing computing systems with respect to managing access to digital content shared across multiple geographic regions.

BRIEF DESCRIPTION OF THE DRAWINGS

The detailed description provides one or more implementations with additional specificity and detail through the use of the accompanying drawings, as briefly described below.

DETAILED DESCRIPTION

Figure 1A:
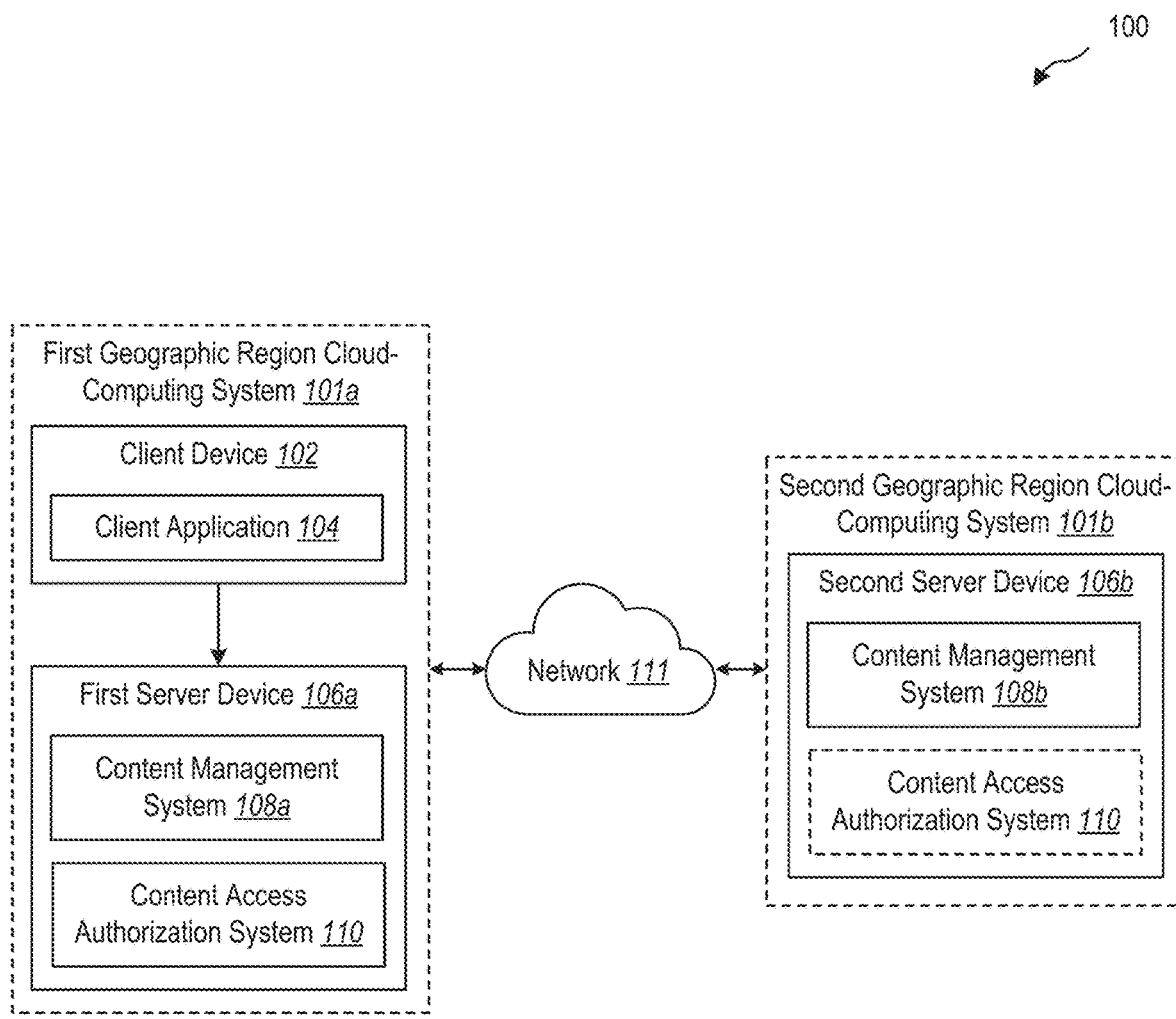
FIGS. 1A-1B illustrate a diagram of a computing system environment where a content access authorization system is implemented in accordance with one or more implementations.

Implementations of the present disclosure provide benefits and/or solve one or more of the foregoing or other problems in the art with systems, non-transitory computer-readable media, and methods that provide a content access authorization system to determine user access control efficiently and flexibly for digital documents that are stored in different geographic regions. For instance, the content access authorization system can convert sensitive user information for digital documents stored in a first geographic region into a probabilistic data structure that does not include user information and share the probabilistic data structure with a second geographic region. The content access authorization system can then utilize the probabilistic data structure to efficiently pre-filter user document access control for digital documents requested by a user in the second geographic region that are stored in the first geographic region, which significantly saves on latency and computing resource usage by reducing the number of document control access queries needed to be made to the first geographic region.

To illustrate, in a number of implementations, the content access authorization system receives or identifies a user request for a user in a first geographic region to access a document (i.e., digital document) stored in a second geographic region. In addition, the content access authorization system can determine, based on a shallow version of the document stored in the first geographic region, that a full version of the document is stored in the second geographic region. Further, the content access authorization system can determine whether the user has permissions (e.g., access rights) to access the full version of the document stored in the second geographic region by utilizing an access control probabilistic data structure that hides user identities (e.g., the probabilistic data structure does not include any information from which user identities can be derived) and that is stored in the first geographic region. Additionally, the content access authorization system can grant or deny the user in the first geographic region access to the full version of the document stored in the second geographic region based on the determination from the access control probabilistic data structure.

As described herein, the content access authorization system provides several technical benefits in terms of computing flexibility and efficiency compared to existing computing systems. Indeed, the content access authorization system provides several practical applications that deliver benefits and/or solve problems associated with document access control.

To illustrate, in various implementations, the content access authorization system improves flexibility by providing efficient alternatives to sending queries or calls for large numbers of documents with which users are associated. For example, in various implementations, the content access authorization system utilizes a probabilistic data structure (e.g., a bloom filter, cuckoo filter, ribbon filter, etc.) to quickly determine when a user in a first geographic region does not have permission to access a document stored in another region. In this manner, the content access authorization system prevents a significant number of calls to be made to the other region, which reduces both latency and resource usage, particularly if the other region is located on the opposite side of the world, as is common in multinational companies.

As additional context, the content access authorization system generates an access control block (e.g., access control list) for a document that indicates different permissions and access rights granted to users associated with the document. Additionally, the content access authorization system stores this access control block locally (e.g., at a local data center) in connection with storing the document locally. As noted above, in many instances, because of data handling standards, the access control block cannot be shared with different geographic regions (because the access control block contains sensitive user information not allowed to leave the local geographic region without user consent).

Accordingly, in some implementations, the content access authorization system generates a probabilistic data structure of the access control block that hides and removes user information but also prevents the discovery of user information through reverse-engineering (e.g., user information cannot be derived, discovered, or reversed engineered from the probabilistic data structure). For example, in various instances, the content access authorization system generates, in the same geographic region where the document is being stored, the probabilistic data structure as a lossy transformation of the access control block, which reduces the memory footprint needed to store safeguarded versions of the access control block. The content access authorization system can share the probabilistic data structure to other geographic regions and utilize the probabilistic data structure in the other geographic regions to efficiently pre-filter user access to the document when access to the document is requested by a user in one of the other geographic regions.

In addition, the content access authorization system provides improved efficiency over existing computing systems. To illustrate, when a user request is made in a second geographic region (e.g., a remote region) to access a document stored in a first geographic region (e.g., a source region), the content access authorization system can utilize the probabilistic data structure to quickly determine, at a local level with perfect accuracy, when the user does not have permission to access the document. Thus, unlike existing computing systems that require $O(n)$ operations to determine document access rights, the content access authorization system can determine document access rights with much fewer operations (e.g., in some instances, $O(k)$ operations where k corresponds to a number of hash functions used to generate or query a probabilistic data structure).

Further, with a high level of accuracy, the content access authorization system can determine when a user should be granted permission to access the document. In many of these instances, to ensure full data privacy, the content access authorization system can send a query to the first geographic region to verify and/or retrieve document content of the requested document. In this manner, the content access authorization system ensures low latency across geographic regions when providing data access control. Indeed, this enables users (e.g., users at a multinational company operating across geographic regions) to have the same user experience as those users operating within a single region.

As illustrated in the foregoing discussion, the present disclosure utilizes a variety of terms to describe the features and advantages of one or more implementations described herein. For instance, the term "digital document" (or simply "document") refers to a type of digital content item. In various implementations, a document includes a file of saved content. For example, a document can include various types of content such as text, images, audio, code, metadata, etc. In various implementations, documents are included in a document graph and/or another type of graph (i.e., a network graph) as nodes connected via edges. For instance, the document graph can indicate relationships between elements and can connect document nodes to user nodes and/or other nodes, such as entity nodes (e.g., groups, teams, companies, etc.)

As a note, while this disclosure described various implementations in terms of documents, the content access authorization system can perform similar operations and actions on other types of digital content and/or digital content items. For example, the content access authorization system can be a digital content access control system that efficiently determines access rights and permissions for digital content items.

Additionally, a document can include various document versions. For example, a document can include a shallow version or a full version. As used herein, a "full version" of a document (or full-version document) refers to a document that includes its content. In addition, a full version of a document can also include metadata and other information about the document, such as an access control block for the document. In various implementations, the full version of a document does not hide or remove portions of the document or corresponding document information.

As used herein, a "shallow version" of a document (or shallow-version document) refers to a truncated version of the document. For example, in many implementations, a shallow version of a document does not include document content. In various instances, a shallow version of a document does not include user identifiers or other user data. In example instances, a shallow version of a document includes a document address (e.g., URL) and/or activity data of the document, such as by whom, when, where and/or how modifications occurred. For example, in one or more implementations, a shallow version of a document is a placeholder version of a document that indicates where the full version of the document is located (e.g., the geographic region in which the full-document version is stored).

In some implementations, a document is associated with an access control block. As used herein, an "access control block" refers to a set of rules that indicates which users or systems are allowed access to a given document, digital content item, object, and/or resource. In various implementations, a document can be associated with an access control block. In addition, an access control block can include other control types for compliance such as user group labels (e.g., co-workers, teams, workgroups, company employees, association members, etc.), defined content sensitivity labels (e.g., confidential, highly confidential, public, etc.), or organization partitions (e.g., information barriers).

Additionally, in various implementations, the content access authorization system generates a probabilistic data structure from an access control block (e.g., access control list). As used herein, the term "access control probabilistic data structure" (or simply "probabilistic data structure") refers to a data structure that provides a level of document access control while removing hiding (i.e., removing) user information, which can include usernames, pseudonymous identifiers, or other sensitive user information. In particular, while a probabilistic data structure can be shared across geographic regions, a probabilistic data structure cannot be used to derive user information. In various implementations, a probabilistic data structure is a lossy transformation of access control block data that removes user information. Examples of probabilistic data structure include, but are not limited to, bloom filters, cuckoo filters, ribbon filters, fuse filters, xor filters, etc.

As used herein, the term "geographic region cloud-computing system" (or simply "geographic region") refers to one or more computing systems residing in an area defined by physical or virtual boundaries. For example, a geographic region can be defined by the borders of a country or a cluster of countries, such as an Asia and Pacific region, European region, African region, North American region, etc. As another example, a geographic region can be defined by ties to a cloud-computing system, data center, and/or a cluster of co-located data centers. In various implementations, geographic regions do not overlap. In some implementations, geographic regions have some amount of overlap. In some cases, a geographic region can be located within another geographic region (e.g., an air-gapped cloud-computing system located within a larger cloud-computing system).

Notably, a geographic region can be associated with user information restrictions, regulations, rules, and/or requirements. For example, a geographic region may be governed by data handling standards that regulate the sharing of user information outside the region. For instance, some data handling standards require that user information not implicitly or explicitly leave the geographic region unless specifically requested or initiated by the user being affected. In some instances, a user must provide authorization for their user information (e.g., a user identifier or pseudonymous identifier), or data about their user information, to be shared with different geographic regions.

As used herein, a "cloud-computing system" refers to a network of connected computing devices that provide various services to computing devices (e.g., client devices, server devices, provider devices, customer devices, etc.). For instance, as mentioned above, a distributed computing system can include a collection of physical server devices (e.g., server nodes) organized in a hierarchical structure including clusters, computing zones, virtual local area networks (VLANs), racks, fault domains, etc. In various implementations, the network is a virtual network or a network having a combination of virtual and real components.

Figure 1B:
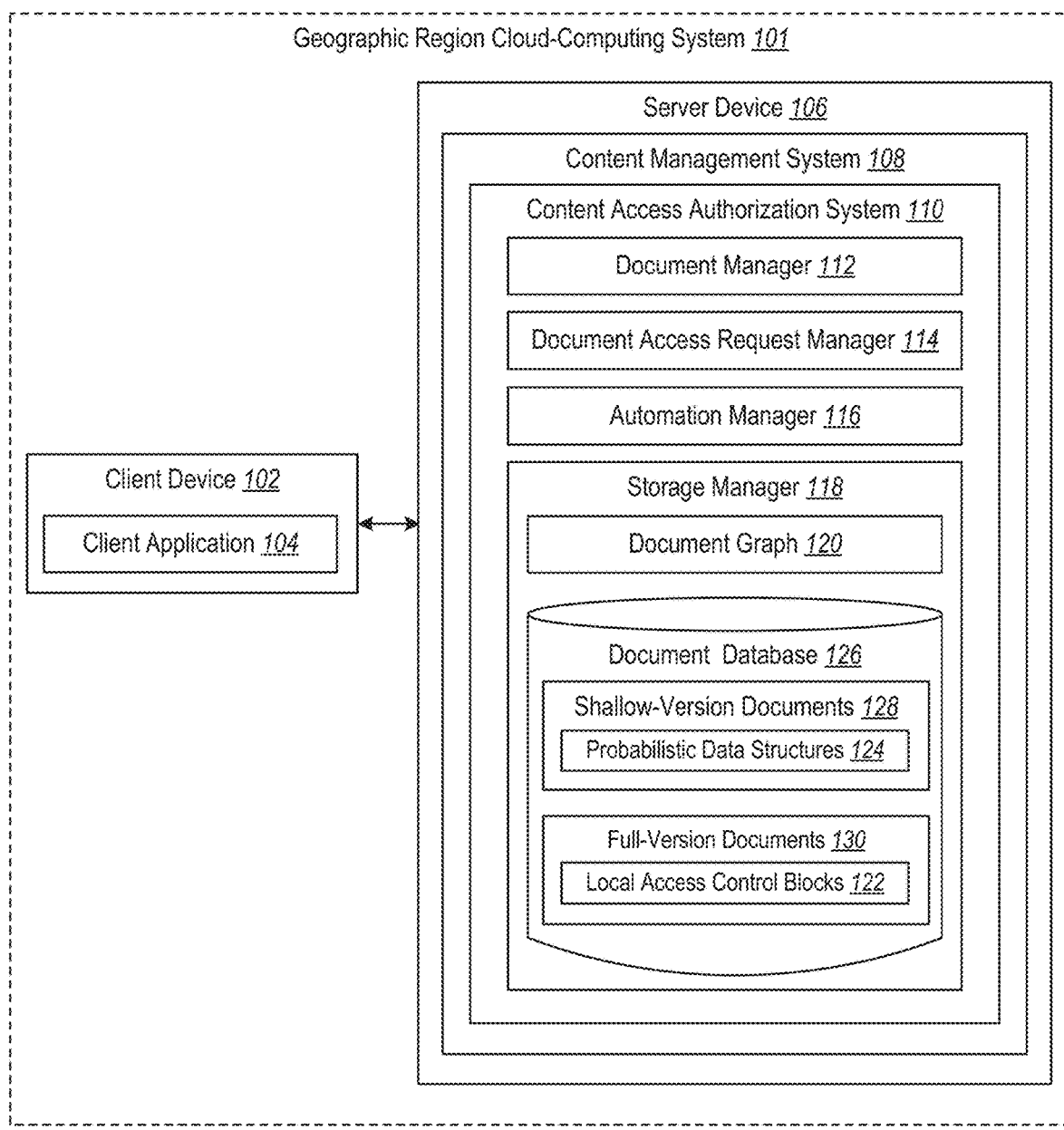

Additional detail is now be provided regarding the components and elements of the content access authorization system. For example, FIGS. 1A-1B illustrate a schematic diagram of an environment 100 (i.e., a digital medium system environment) for implementing a content access authorization system 110. In particular, FIG. 1A includes the environment 100 and FIG. 1B provides additional detail regarding components and elements of the content access authorization system 110.

As shown in FIG. 1A, the environment 100 includes a first geographic region cloud-computing system 101a (or simply "first geographic region 101a") and a second geographic region cloud-computing system 101b (or simply "second geographic region 101b") connected via a network 111. Notably, the first geographic region 101a and the second geographic region 101b are located in different geographic regions. For example, the first geographic region 101a is located in Europe, and the second geographic region 101b is located in North America.

As shown, the first geographic region 101a is shown to include a client device 102 and a first server device 106a (which is part of a first cloud-computing system). As also shown, the second geographic region 101b includes a second server device 106b (which is part of a second cloud-computing system). Additional detail regarding these and other computing devices is provided below in connection with FIG. 6. In addition, FIG. 6 also provides additional detail regarding networks, such as the network 111 shown.

While the first geographic region 101a includes a client device 102 and the first server device 106a, the first geographic region 101a can include any number of client devices or server devices. For example, the first server device 106a can represent a cluster of server devices. Similarly, while no client devices are shown in the second geographic region 101b for simplicity, the second geographic region 101b can include client devices and/or multiple server devices. In various implementations, the first geographic region 101a and the second geographic region 101b can include similar or different network structures and/or system architecture.

As shown, the first geographic region 101a includes the client device 102 having a client application 104. In various implementations, the client device 102 is associated with a user (e.g., a user client device), such as a user that interacts with both locally and remotely stored documents. In one or more implementations, the client device 102 interacts directly or indirectly with the content access authorization system 110 to gain access to digital documents stored in different geographic regions, as provided below.

As mentioned above, the first geographic region 101a includes the first server device 106a, which includes a content management system 108a. As shown, the content management system 108a includes a content access authorization system 110. The content management system 108a is further described below in connection with FIG. 1B.

In various implementations, the content access authorization system 110 efficiently determines user permissions and retrieves document content stored both locally and remotely (e.g., within the first geographic region 101a and the second geographic region 101b). As provided below, in many instances, in response to detecting a user request to access a remotely stored document, the content access authorization system 110 can utilize a locally stored probabilistic data structure (i.e., an access control probabilistic data structure) associated with a document to quickly determine when the user does not have access rights to the document without needed to send a call to the remote geographic region in which a full version of the document is stored. In some implementations, the content access authorization system 110 utilizes the probabilistic data structure to determine when a user likely has access rights and when a call to the geographic region where the document is stored is needed to retrieve document content of the document. Additional detail regarding the content access authorization system 110 is provided below with respect to FIG. 1B.

As shown in FIG. 1A, the second geographic region 101b includes similar components to the first geographic region 101a. For example, the second geographic region 101b includes the second server device 106b having a content management system 108b, which can be similar to the content management system 108a. The second geographic region 101b can also include another instance of the content access authorization system 110.

As mentioned above, FIG. 1B provides additional detail regarding the capabilities and components of the content access authorization system 110. To illustrate, FIG. 1B shows a geographic region cloud-computing system 101 (or simply "geographic region 101") having the client device 102 and a server device 106. In various implementations, the geographic region 101 represents the first geographic region 101a or the second geographic region 101b introduced above. Similarly, the server device 106 can represent the first server device 106a or the second server device 106b provided above.

As shown, the server device 106 can include a content management system 108. In various implementations, the content management system 108 can perform a variety of functions. For example, in one or more implementations, the content management system 108 facilitates the distribution of various digital content (e.g., documents) across the geographic region 101 and/or other computing devices. In some implementations, the content management system 108 facilitates, identifies, receives, accesses, opens, loads, edits, modifies, moves, copies, shares, saves, removes, deletes, stores, downloads, transmits, and/or imports digital content.

As also shown, the content management system 108 includes the content access authorization system 110. In various implementations, the content access authorization system 110 is located apart from the content management system 108. For instance, the content access authorization system 110 is located on the same computing device or devices as the content management system 108, but as a separate system. In some cases, the content access authorization system 110 and the content management system 108 or located on different computing devices. As noted above, while documents are described herein, the content access authorization system could additionally or alternatively be a digital content access control system.

As shown, the content access authorization system 110 includes various components and elements. For example, the content access authorization system 110 includes a document manager 112, a document access request manager 114, an automation manager 116, and a storage manager 118. As also shown, the storage manager 118 can include a document graph 120 and a document database 126 that includes shallow-version documents 128 having probabilistic data structures 124 and full-version documents 130 having local access control blocks 122.

As shown, the content access authorization system 110 includes the document manager 112. In one or more implementations, the document manager 112 receives, accesses, provides, edits, modifies, identifies, creates, or otherwise manages the documents, including shallow-version documents 128 and full-version documents 130 stored within the document database 126. In example implementations, documents are stored within the document graph 120. In some implementations, the document manager 112 manages the document graph 120 by adding, removing, modifying, searching, traversing, spanning, walking, and/or querying the document graph 120 for various document versions (e.g., depending on if the full-version document 130 is stored locally or remotely).

As shown, the content access authorization system 110 includes the document access request manager 114. In various implementations, the document access request manager 114 facilitates identifying, determining, detecting, storing, accessing, or otherwise managing access control to documents. In one or more implementations, the document access request manager 114 accesses local access control blocks 122 to determine user permissions for documents stored within the geographic region 101. In one or more implementations, the document access request manager 114 generates a probabilistic data structure from an access control block and/or shares the probabilistic data structure with another geographic region (in connection with sharing a shallow version or the corresponding document). As shown, in some instances, the probabilistic data structures 124 are part of shallow-version documents 128 while the local access control blocks 122 are part of the full-version documents 130. In other instances, the local access control blocks 122 and/or the probabilistic data structures 124 are located separately.

In some implementations, the document access request manager 114 utilizes the probabilistic data structures 124 to determine when queries or calls to another geographic region can be avoided. For example, the document access request manager 114 utilizes a probabilistic data structure to determine when a user does not have access to a document that is stored in another geographic region. In various implementations, when a user is authorized to access a document, the document access request manager 114 can retrieve digital content from a full version of the document that is stored in another geographic region as only a shallow version of the document is stored in the user's local geographic region.

As also shown, the content access authorization system 110 includes the automation manager 116. In various implementations, the automation manager 116 generates, identifies, edits, modifies, receives, curates, analyzes, accesses, provides, or otherwise manages user-specific document insights. For example, the automation manager 116 can detect a user action, such as visiting a website or navigating to a shared folder, and in response, run one or more automated actions that query permission rights of the user with respect to multiple documents (included remotely stored documents). For instance, the automation manager 116 traverses the document graph 120 and performs one or more checks per document node (e.g., via the document access request manager 114) to obtain information between the user and each document. In additional implementations, the automation manager 116 compiles and presents the user-specific document insights to the user.

Additionally, the content access authorization system 110 includes the storage manager 118. In various implementations, the storage manager 118 can include any data used by any of the components of the content access authorization system 110 in performing the features and functionality described herein.

As shown, the geographic region 101 includes the client device 102 having the client application 104. In some implementations, the content access authorization system 110 includes a web hosting application that allows the client device 102 to interact with content and services hosted on the server device 106 (e.g., via the client application 104). To illustrate, in one or more implementations, the content access authorization system 110 provides an interface to view, edit, or otherwise modify documents to which a user on the client device 102 has permission to access. In various implementations, the content access authorization system 110 obtains document access permissions as part of a background service, but is still triggered by user interaction (e.g., a user logging into a target website).

Figure 2:
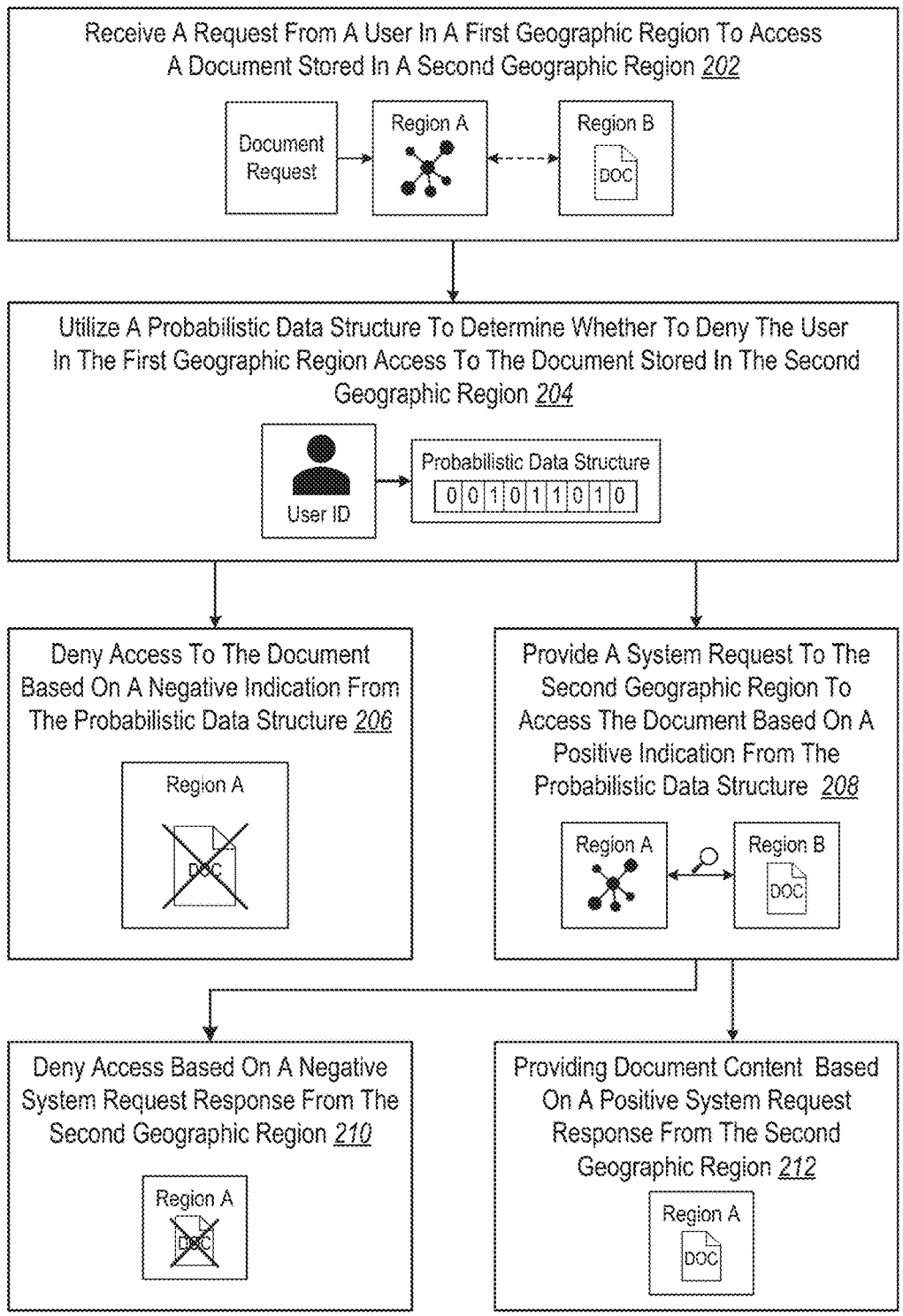
FIG. 2 illustrates an example workflow for efficiently determining user document access control for a set of shared digital documents across different geographic regions utilizing probabilistic data structures in accordance with one or more implementations.
Figure 3A:
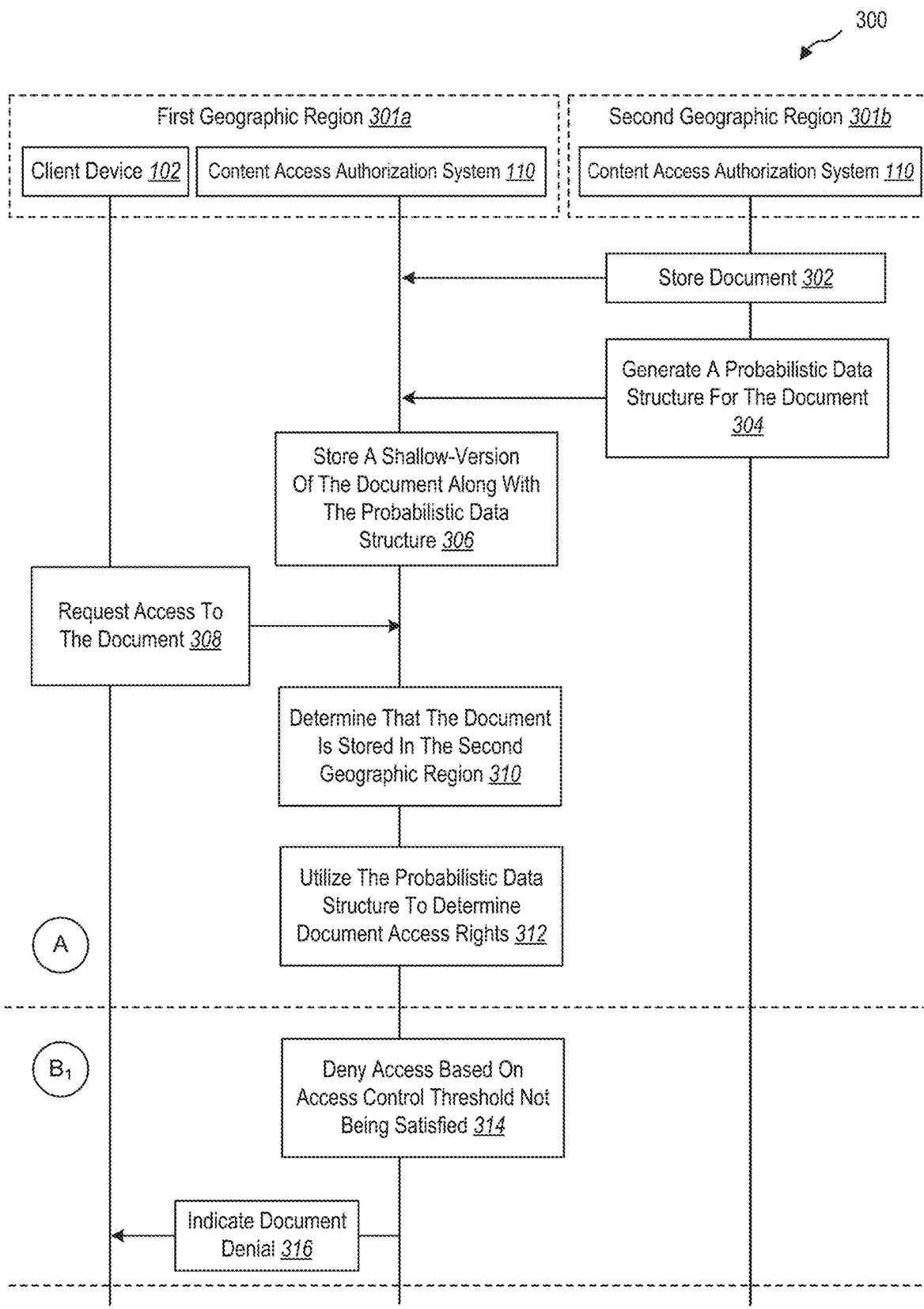
FIGS. 3A-3C illustrate a sequence diagram of efficiently managing user access control for sharing digital content items across different geographic regions in accordance with one or more implementations.
Figure 3B:
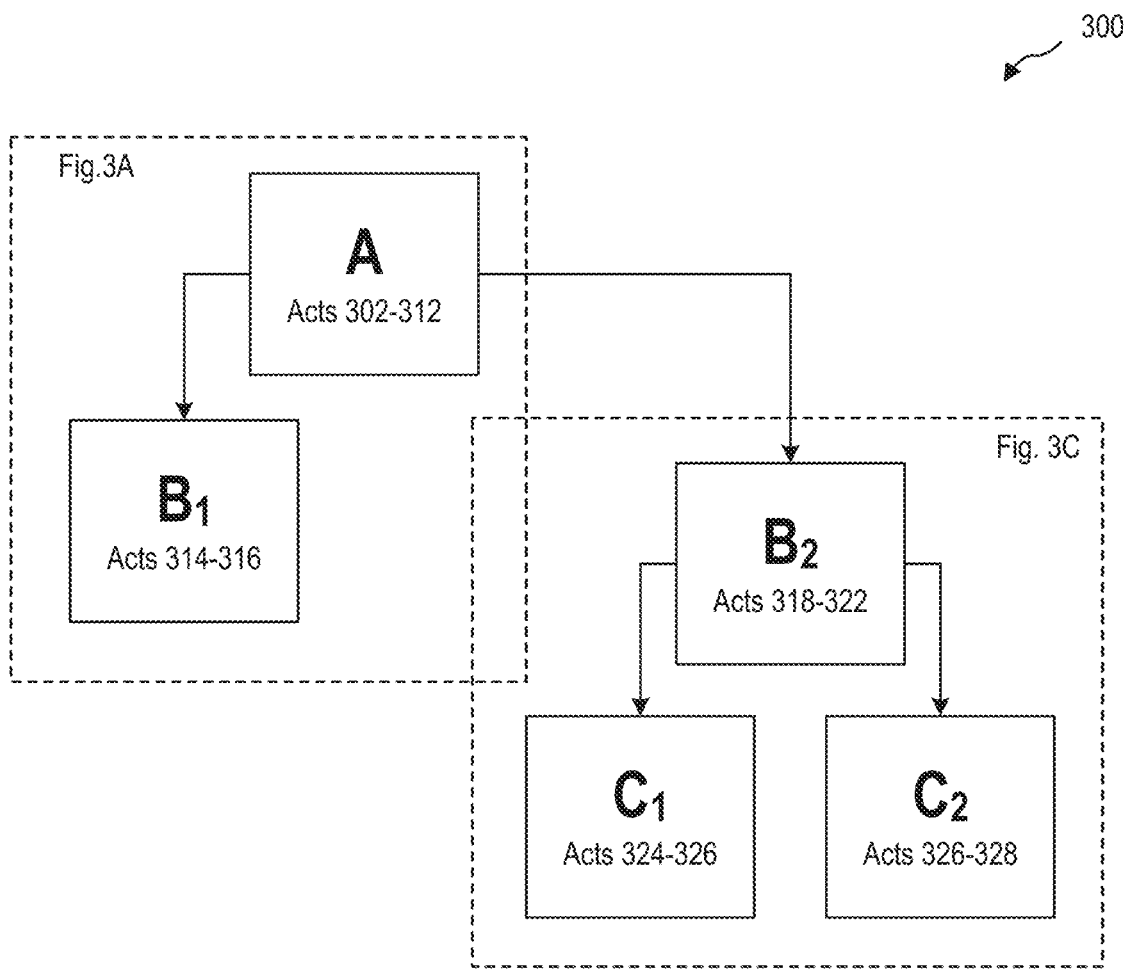
Figure 3C:
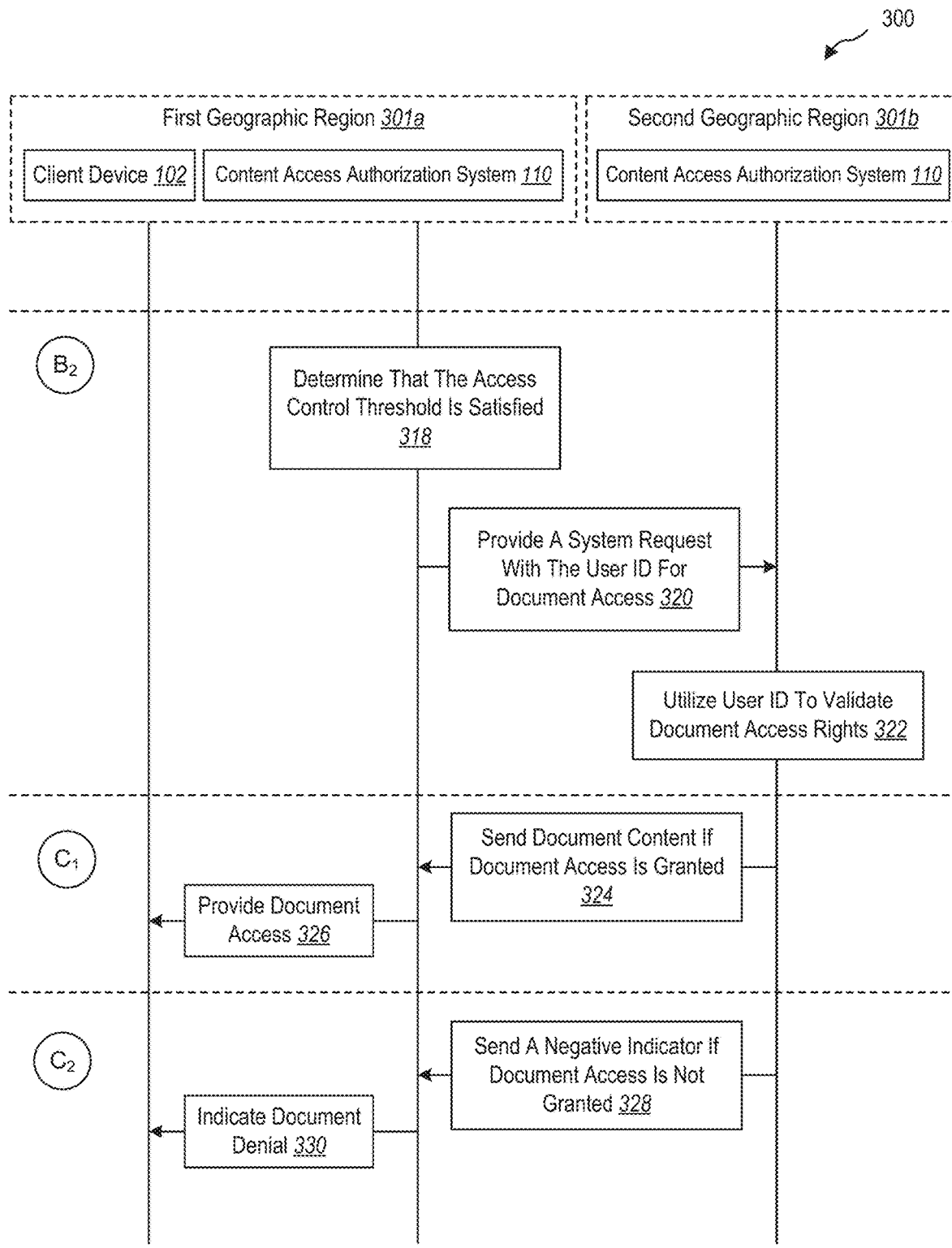

Additional detail in connection with an example implementation of the content access authorization system 110 is discussed in connection with FIG. 2. For example, FIG. 2 illustrates an example workflow for efficiently determining user document access control for a set of shared digital documents across different geographic regions utilizing probabilistic data structures in accordance with one or more implementations. As shown, FIG. 2 illustrates a series of acts 200, which can be performed by the content access authorization system 110 and/or a content management system 108. While FIG. 2 provides an overview of the content access authorization system 110, FIGS. 3A-3C provide additional detail regarding the operations and actions of the content access authorization system 110.

As shown in FIG. 2, the series of acts 200 includes an act 202 of receiving a user request for a user in a first geographic region to access a document stored in a second geographic region. For instance, in various implementations, the content access authorization system 110 detects a request from a user to access a document. In response, the content access authorization system 110 may locate a shallow version of the document stored in the first geographic region (e.g., by searching a document graph), which indicates that the full version of the document is stored in the second geographic region.

As shown in FIG. 2, the series of acts 200 includes an act 204 of utilizing a probabilistic data structure (i.e., an access control probabilistic data structure) to determine whether to deny the user in the first geographic region access to the document stored in the second geographic region. For instance, if the probabilistic data structure is a bloom filter, the content access authorization system 110 compares an encoded (e.g., hashed) user identifier to the bloom filter stored within the first geographic region to confirm that the user does not have privileges to access the content of the requested document. For example, the content access authorization system 110 encodes a user identifier or pseudonymous identifier of the user into a number or value that falls within a range of entries for the probabilistic data structure and maps the encoded user identifier to the corresponding entry in the bloom filter (i.e., the probabilistic data structure).

As shown in FIG. 2, the series of acts 200 includes an act 206 of denying access to the document based on a negative indication from the probabilistic data structure. For instance, the content access authorization system 110 can utilize the probabilistic data structure to confirm with complete confidence when user permissions for a document are not present. For example, if the encoded user identifier returns a negative result, the content access authorization system 110 can confirm that the user identifier is not listed within the access control block corresponding to the document.

As shown in FIG. 2, the series of acts 200 includes an act 208 of providing a system request to the second geographic region to access the document from the second geographic region based on a positive indication from the probabilistic data structure. For example, if the encoded user identifier returns a negative result, the content access authorization system 110 determines to further verify that the user has the necessary permission to access the document. In some implementations, this may involve sending a query or call from the first geographic region to the second geographic region requesting user permission confirmation and/or for the second geographic region to provide the document content to the first geographic region.

As shown in FIG. 2, the series of acts 200 includes an act 210 of denying access to the document based on a negative system request response from the geographic region. For example, upon receiving the document query from the first geographic region, the content access authorization system 110 operating in the second geographic region (or simply the second geographic region) compares the user identifier to one or more access control blocks stored in connection with a full version of the document at the second geographic region. In some cases, the content access authorization system 110 on the second geographic region determines that the user is not included in the access control block as having access permissions.

As also shown in FIG. 2, the series of acts 200 includes an act 212 of providing document content based on a positive system request response from the second geographic region. For example, in various implementations, the second geographic region identifies the user identifier on the access control block for the document. In response, the second geographic region sends back the content of the document to the first geographic region such that the first geographic region provides the full version of the document for the user to access.

As mentioned above, FIGS. 3A-3C provide additional detail regarding the operations and actions of the content access authorization system 110. As illustrated, FIGS. 3A-3C show a sequence diagram of efficiently managing user access control for sharing digital content items across different geographic regions in accordance with one or more implementations. For example, FIGS. 3A-3C include a series of acts 300 performed by various computing devices.

In particular, FIGS. 3A-3C show a first geographic region 301a having a client device 102 and a content access authorization system 110. FIGS. 3A-3C also include a second geographic region 301b having another instance of the content access authorization system 110. In various implementations, the first geographic region 301a and the second geographic region 301b represent the first geographic region 101a and the second geographic region 101b described above.

To illustrate, the series of acts 300 in FIG. 3A includes an act 302 of the content access authorization system 110 storing a document within the second geographic region 301b. For instance, the content access authorization system 110 operating in the second geographic region 301b stores a document created and/or modified within the second geographic region 301b. For example, a first user in the second geographic region 301b creates a document and shares the document with a team (i.e., a group) of users where one or more of the users reside in the first geographic region 301a. Accordingly, the content access authorization system 110 operating on the second geographic region 301b can securely store the full version of the document within the second geographic region 301b.

As shown, the content access authorization system 110 operating in the second geographic region 301b can provide a copy of the document to other geographic regions. For example, the content access authorization system 110 adds the document to a document graph (or another type of network graph that includes documents) or a network storage location. In one or more implementations, updates to the document graph may be pushed to other geographic regions.

In some instances, only a shallow version of the document is pushed to other geographic regions. For instance, the content access authorization system 110 stores a full version of the document in the second geographic region 301b and a shallow version of the document in the first geographic region 301a. As noted above, while shallow versions of documents Can include metadata and other activity data of the document, shallow versions generally do not include document content or other user information.

In addition, the series of acts 300 can include an act 304 of the content access authorization system 110 generating a probabilistic data structure for the document. For example, in connection with storing the document, the content access authorization system 110 operating in the second geographic region 301b can generate one or more probabilistic data structures for a document and provide them to other geographic regions. As shown, the content access authorization system 110 on the second geographic region 301b can provide the probabilistic data structure to the first geographic region 301a.

In various implementations, the content access authorization system 110 generates an access control block that indicates security behaviors and permissions associated with the document. For example, an access control block includes a list of access control entities and corresponding granted access rights or permissions (e.g., for users and systems). In some instances, when the document is being shared with users on a team, the access control block includes user identities for each member of the team with which the document is shared. In some implementations, the access control block may indicate that one user is granted a first set of permissions (e.g., read-only rights) and a second user is granted a second set of permissions (e.g., read and write rights).

In one or more implementations, the content access authorization system 110 generates a probabilistic data structure (i.e., an access control probabilistic data structure) from an access control block for a document. For example, the content access authorization system 110 creates a probabilistic data structure to indicate which users (and systems) have access rights by encoding the user identities of the users (and system identities) into the probabilistic data structure while still protecting the user identities by removing them and other sensitive user information from the probabilistic data structure. In this manner, the probabilistic data structure can serve as a lossy transformation of access control block data, which can be considered system metadata as opposed to user information and thus, able to be shared across geographic regions without violating data handling standards.

In some cases, the content access authorization system 110 utilizes one or more hash functions to encode user identities and/or other user information into a bit array or other types of probabilistic data structure. For instance, the content access authorization system 110 utilizes a double hash operation with the user identities to generate a bloom filter for the document. In other instances, the content access authorization system 110 utilizes other types of operations to generate the probabilistic data structure.

In various implementations, the content access authorization system 110 creates multiple probabilistic data structures from an access control block of a document. For instance, the content access authorization system 110 creates a first probabilistic data structure that indicates users that have read-only permission to the document. Additionally, the content access authorization system 110 creates a second probabilistic data structure that indicates users having read and write privileges of the document. Because a probabilistic data structure (i.e., an access control probabilistic data structure) can be saved as a bit array or even converted into an integer, the content access authorization system 110 can create multiple probabilistic data structures for a document using very little memory. Further, creating separate probabilistic data structures that address individual permission levels allows the content access authorization system 110 in other regions to determine user document access rights more quickly and efficiently.

As shown, the series of acts 300 can include an act 306 of the content access authorization system 110 storing a shallow version of the document along with the probabilistic data structure. For example, the content access authorization system 110 operating in the first geographic region 301a can receive or otherwise identify both the shallow version of the document as well as a corresponding probabilistic data structure. In some instances, the content access authorization system 110 updates a local document graph to include these elements.

Subsequently, the client device 102 within the first geographic region may directly or indirectly request access to the document. Accordingly, as shown, the series of acts 300 can include an act 308 of the client device 102 requesting access to the document within the first geographic region 301a. As one example, a user may attempt to open the document via the client device 102. As another example, the user may perform a function or operation that triggers the content access authorization system 110 to determine access to one or more files including the document, which is further described below. In either example, the content access authorization system 110 operating in the first geographic region 301a may detect a user initiated action requesting to access the document.

As shown, the series of acts 300 includes an act 310 of the content access authorization system 110 determining that the document is stored in the second geographic region 301b. For example, upon receiving the user request to access the document, the content access authorization system 110 operating in the first geographic region 301a locates the shallow version of the document within its version of a document graph. Then, from the shallow version of the document, the content access authorization system 110 can determine that the full version of the document is stored in the second geographic region 301b. In some implementations, only the probabilistic data structure for the document is accessible within the first geographic region 301a. (e.g., only the probabilistic data structure is stored, or the shallow version of the document includes only one or more probabilistic data structures).

As also shown, the series of acts 300 includes an act 312 of the data access control system 110 utilizing the probabilistic data structure to determine document access rights. For instance, when sending a call or query to the second geographic region 301b, the content access authorization system 110 operating in the first geographic region 301a locally processes the probabilistic data structure to quickly and efficiently determine whether the requesting user (i.e., the client device 102) has permission to access the document or whether a call to the second geographic region 301b is necessary. Indeed, in many instances, calls to the second geographic region 301b may be avoided, which results in reduced latency, bandwidth usage, and computing resources usage. Indeed, based on the results of comparing the user identifier (or pseudonymous identifier) to the probabilistic data structure, the content access authorization system 110 may perform different actions, which are described below.

To elaborate, the acts 302-312 in the series of acts 300 belong to a first path indicated as "A" on the left side of FIG. 3A (i.e., Path A). Following the act 312, the series of acts 300 can branch into two paths (i.e., Path B1 and Path B$_2$) indicated as "B1" in FIG. 3A and "B2" in FIG. 3C. Later on, the series of acts 300 can further branch Path B2 into two additional paths (i.e., Path C1 and Path C2), indicated as "C1" and "C2" in FIG. 3C. For ease of explanation, FIG. 3B includes an overview diagram of the various paths described with respect to the series of acts 300.

Returning to FIG. 3A, as noted above, in following Path A, the content access authorization system 110 may compare the user identifier to the probabilistic data structure. In some implementations, based on the result of the comparison, the content access authorization system 110 advances to Path B1.

To illustrate, as shown, the series of acts 300 includes an act 314 of the content access authorization system 110 on the first geographic region 301a denying access based on an access control threshold not being satisfied. For example, the data access control system 110 may encode the username (i.e., user identifier or pseudonymous identifier) of the requesting user (i.e., the client device 102) and map it to one or more entries in the probabilistic data structure. In particular, the content access authorization system 110 can encode a user identifier of the user into a number or token that falls within a range of entries for the probabilistic data structure and map the encoded user identifier to the corresponding entry in the probabilistic data structure. Then, based on the result or value within the one or more entries, the content access authorization system 110 can very quickly determine that an access control threshold is not satisfied.

Because the content access authorization system 110 performs the act 314 locally on the first geographic region 301a, the content access authorization system 110 can "fail fast" and reduce the number of required fanout calls to the second geographic region 301b, which saves on latency and computer resource usage. Indeed, the content access authorization system 110 can quickly pre-filter out user document access control requests for which user do not have permission locally in the first geographic region 301a rather than sending these same requests to the second geographic region 301b.

To illustrate by way of example, suppose the probabilistic data structure is a bloom filter of a bit array with entries that have either a value of 0 or a value of 1. In this example, the content access authorization system 110 can encode (e.g., hash) the user identifier into a number that falls within the range of entries for the bloom filter and map it to the corresponding entry of the bloom filter. If the entry has a value of 0, then the user identifier does not have permission to access the document (i.e., the access control threshold is not satisfied). In this case, a value of 0 in the entry corresponding to the encoded user identifier indicates that the user identifier is not included in the probabilistic data structure, and thus, not included in the corresponding access control block for the document. If, however, the entry has a value of 1, this signals that the user identifier likely has permission to access the document, but that more information is needed before a fully-accurate determination can be made (i.e., the access control threshold is satisfied). In this example, a value above 0 may satisfy the access control threshold.

In some instances, in the above example, the content access authorization system 110 encodes the user identifier by performing multiple hashes and mapping each hash to different entries within the bloom filter. If all of the mapped entries map to values of 0, then the user does not have permission to access the document. Otherwise, if one or more of the encoded values map to a value of 1, more information is again needed.

As shown, the series of acts 300 includes an act 316 of the content access authorization system 110 operating in the second geographic region 301b indicating a document denial to the client device 102. For example, in some implementations, the content access authorization system 110 indicates to the client device 102 that the requested access type for the document is denied because the user identifier does not have these sufficient access permissions.

In some implementations, the data access control system 110 indicates a document denial by hiding or removing the document from a list, interface, or insight that is to be provided to the user. For instance, in these implementations, the content access authorization system 110 is validating user access control permissions of the document as part of a background process.

Turning now to FIG. 3C, the content access authorization system 110 may determine to take another path (e.g., Path B2) based on the results of the act 312. For example, upon utilizing the probabilistic data structure to determine document access rights, the content access authorization system 110 may determine that the access control threshold is satisfied and advance to Path B2. Accordingly, as shown in Path B2, the series of acts 300 includes an act 318 of the content access authorization system 110 on the first geographic region 301a determining that the access control threshold is satisfied. For example, the content access authorization system 110 may determine that the user identifier is likely included in the probabilistic data structure. However, because the probabilistic data structure is a lossy transformation of the access control block, the access control threshold being satisfied may be a false positive indication that the user should be granted rights to the document.

As shown, the series of acts 300 includes an act 320 of the content access authorization system 110 operating in the first geographic region 301a providing a system request with the user ID (i.e., user identifier) for document access to the second geographic region 301b. For example, for the content access authorization system 110 operating in the first geographic region 301a to make a fully-accurate determination regarding user permissions of the document, in various implementations, the content access authorization system 110 must reach out to the second geographic region 301b (e.g., the home geographic region that stores the full version of the document and a corresponding access control block).

In one or more implementations, the content access authorization system 110 operating in the first geographic region 301a automatically generates and sends out a system request (e.g., a fanout call) to the second geographic region 301b. For example, the system request identifies the document and the user identifier requesting access. Because the content access authorization system 110 is acting in response to a user initiated action, the content access authorization system 110 can send the user identifier without violating data handling standards. In many instances, the content access authorization system 110 sends the system request using encryption to further safeguard the user identifier.

As shown, the series of acts 300 includes an act 322 of the content access authorization system 110 operating in the second geographic region 301*b* utilizing the user ID to validate document access rights. In some implementations, the content access authorization system 110 operating in the second geographic region 301*b* utilizes a probabilistic data structure to validate document access rights. In other implementations, this content access authorization system 110 validates the user identifier against the access control block, as doing this within the second geographic region 301*b* is not a violation of data handling standards.

Based on the outcome of the document access rights validation, the content access authorization system 110 may again branch into multiple paths. As mentioned above, the content access authorization system 110 can advance to Path C1 or Path C2 Based on whether the content access authorization system 110 operating in the second geographic region 301*b* determines that the user identifier should be granted rights to the document. In particular, if it is determined that the user identifier does not have permission to access the document, the content access authorization system 110 may advance to Path C1. Otherwise, the content access authorization system 110 may advance to Path C2 if it is determined that the user identifier has permission to access the document.

As shown in connection with Path C1, the series of acts 300 includes an act 324 of the content access authorization system 110 operating in the second geographic region 301*b* sending document content to the content access authorization system 110 operating in the first geographic region 301*a* if document access is granted. For example, when the user identifier is found to have permission to access the document, the content access authorization system 110 operating in the second geographic region 301*b* may indicate to the content access authorization system 110 operating in the first geographic region 301*a* which permissions the user identifier is granted with respect to the document. In some cases, the content access authorization system 110 operating in the second geographic region 301*b* responds to the system request with an acknowledgment or negative acknowledgment.

In one or more implementations, when the user identifier is found to have permission to access the document, the content access authorization system 110 operating in the first geographic region 301*a* cannot provide the document to the client device 102 because the shallow version of the document stored in the first geographic region 301*a* does not include document content. Accordingly, in these implementations, the content access authorization system 110 operating in the second geographic region 301*b* can make the document content available to the first geographic region 301*a*.

To illustrate, upon receiving acknowledgment of the system request for document access and/or the document content, the content access authorization system 110 operating in the first geographic region 301*a* can provide document access to the user. As shown, the series of acts 300 includes an act 326 of the content access authorization system 110 operating in the first geographic region 301*a* providing document access to the client device 102.

In some implementations, providing document access includes providing the document itself to the client device 102. In various implementations, providing document access includes including the document within a list, interface, or insight to be provided to the user. In one or more implementations, providing document access includes displaying a preview of the document on the client device 102.

As shown in connection with Path C2, the series of acts 300 includes an act 328 of the content access authorization system 110 operating in the second geographic region 301*b* sending a negative indicator to the content access authorization system 110 operating in the first geographic region 301*a* if document access is not granted. For example, when it is determined that the access control block for the document does not include the user identifier, the content access authorization system 110 operating in the second geographic region 301*b* may indicate such to the content access authorization system 110 operating in the first geographic region 301*a*.

In response, the content access authorization system 110 operating in the first geographic region 301*a* may receive a negative acknowledgment of the system request for document access and indicate a document denial to the client device 102. Thus, as shown, the series of acts 300 includes an act 330 of the content access authorization system 110 operating in the first geographic region 301*a* indicating a document denial to the client device 102. The act 330 can be similar to the act 316 described above.

Figure 4A:
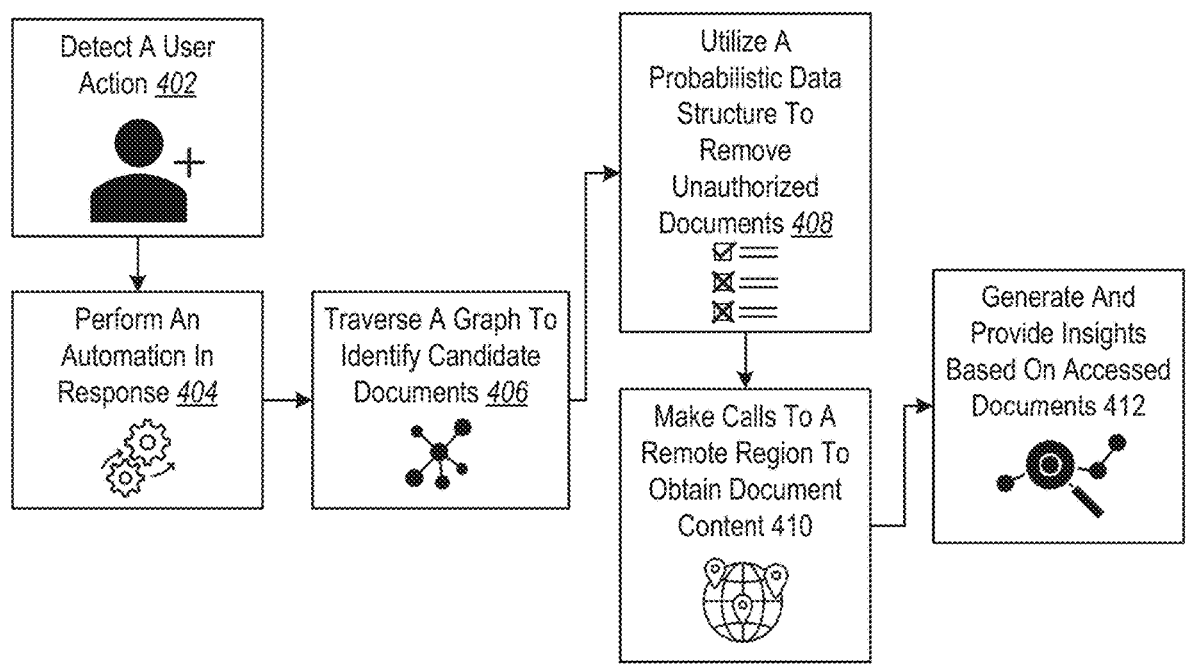
FIGS. 4A-4B illustrate a flow diagram and a user interface for utilizing the content access authorization system to efficiently provide automated insights to a user in accordance with one or more implementations.
Figure 4B:
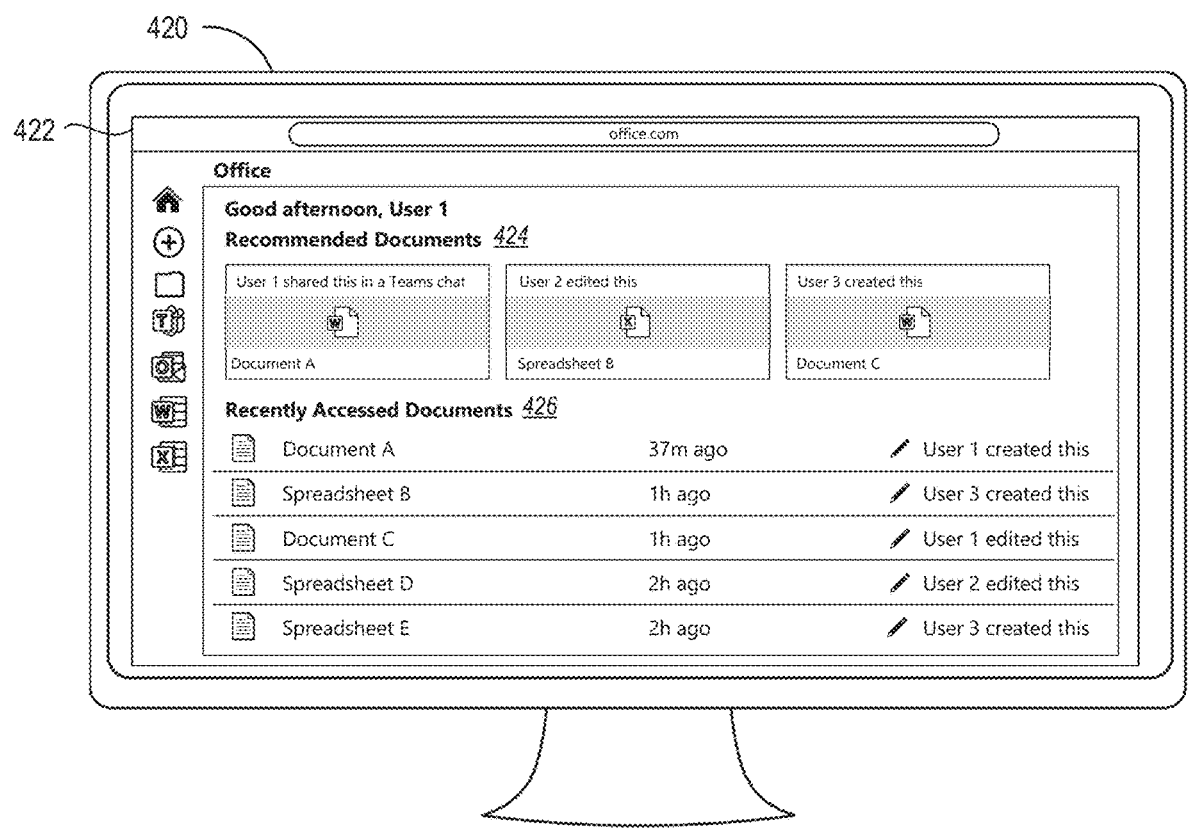

Turning now to FIGS. 4A-4B, additional detail is provided regarding utilizing a probabilistic data structure to perform automations to provide insights to a user. In particular, FIG. 4A illustrates a flow diagram for utilizing the content access authorization system to efficiently provide automated insights to a user in accordance with one or more implementations. FIG. 4B illustrates a user interface for providing automated insights to a user in accordance with one or more implementations.

As shown, FIG. 4A includes an act 402 of detecting a user action. In some implementations, the content access authorization system 110 detects a direct or explicit user action. In other implementations, the content access authorization system 110 detects an indirect or implicit user action. In most cases, the content access authorization system 110 is responding to some type of user initiated request to access one or more documents that are stored in another geographic region.

As an example, a user accesses a document collection that includes multiple documents that are shared with other users. For example, the document collection includes documents that are created, modified, owned, and/or managed by users in a different geographic region. In some cases, the document collection is provided within a local file directory that syncs with cloud storage. In other cases, the document collection is provided via a website or web directory.

As shown, FIG. 4A includes an act 404 of performing an automation in response to detecting the user action. For instance, the content access authorization system 110 performs one or more automations that include querying multiple documents associated with the user. For example, the content access authorization system 110 provides insights to the user such as recently accessed documents, documents worked on by team members or peers, new documents added to a particular directory, documents within an organization, or documents anticipated to be of interest to the user. As another example, the content access authorization system 110 performs other types of automations that involve querying multiple documents that reside in a geographic region different from where the user resides.

As shown, FIG. 4A includes an act 406 of traversing a graph to identify documents. For instance, in various implementations, the content access authorization system 110 traverses a document graph to discover candidate documents that correspond to a given automation. For example, if the automation is to display recently accessed documents, the content access authorization system 110 traverses the document graph to find documents that have been recently accessed, viewed, modified, opened, etc. While the content access authorization system 110 can identify candidate documents by analyzing full versions of documents, the content access authorization system 110 can also identify candidate documents in the graph that are saved as shallow versions. In this manner, the content access authorization system 110 can locate both locally stored documents as well as documents stored remotely in other geographic regions.

To elaborate, the content access authorization system 110 can obtain the necessary information it needs from shallow versions of documents when the full versions of documents are stored in another geographic region. In particular, when traversing the document graph, the content access authorization system 110 is not searching for documents to which the user has access but is searching for candidate documents that satisfy the query conditions of a given automation. Indeed, documents that are stored as shallow versions do not include user information for the content access authorization system 110 to search.

As another example, if the automation is to identify documents associated with a team member or peer, the content access authorization system 110 can locate the team or group (e.g., a security group) on the graph and traverse (e.g., span or walk) the graph to identify candidate documents corresponding to the target team or group. For example, the content access authorization system 110 traverses the graph utilizing a label of the group rather than the user identifier. Again, the content access authorization system 110 can traverse the graph to identify candidate documents without relying on user information.

FIG. 4A also includes an act 408 of utilizing a probabilistic data structure to remove unauthorized documents. For instance, for each candidate document that is stored as a shallow version, the content access authorization system 110 can utilize a probabilistic data structure corresponding to the document to quickly and locally filter out documents to which a user does not have access. In contrast, existing computer systems would send document access requests for each candidate document to a remote geographic region.

In many instances, the content access authorization system 110 will identify a large number of documents that satisfy queries corresponding to a given automation, but for which the user does not have any permissions. For example, the content access authorization system 110 identifies ninefive documents associated with a target team to which the user belongs. However, the content access authorization system 110 utilizes probabilistic data structures to determine that the user does not have permission to access 10% of the documents (e.g., the team is working on a large number of documents, but the user only has permission to access a select few).

Once candidate documents have been filtered out for which the user does not have permission, the content access authorization system 110 can determine access rights for the remaining candidate documents. To illustrate, FIG. 4A includes an act 410 of making calls to a remote region to obtain document content. For example, with the remaining candidate documents (e.g., documents for which a probabilistic data structure indicated a likelihood of user permissions), the content access authorization system 110 can call or query the geographic region in which the full version of a document is stored, as described above.

Additionally, FIG. 4A includes an act 412 of generating and providing insights based on accessed documents. For instance, in various implementations, the content access authorization system 110 analyzes the documents for which the user has permissions and generates user insights to provide to the user. An example of user insights provided to the user is shown in connection with FIG. 4B.

To illustrate, FIG. 4B shows a graphical user interface for providing insights to a user based on documents for which a user has access rights. As shown, FIG. 4B includes a computing device 420 having a graphical user interface 422. In various implementations, the computing device 420 represents the client device 102 introduced above.

As shown, the graphical user interface 422 includes various automated insights for a user called User 1. For example, the graphical user interface 422 includes recommended documents 424 as well as recently accessed documents 426. The documents shown in the graphical user interface 422 are documents for which User 1 has access permissions.

For context, the content access authorization system 110 can provide the graphical user interface 422 shown in FIG. 4B in response to detecting a user document access initiated request. For example, upon User 1 visiting a target website (e.g., office.com), the content access authorization system 110 begins to run one or more automations in the background to generate user insights, which process is described above in connection with FIG. 4A.

As shown, the recommended documents 424 include documents that the content access authorization system 110 has determined to be of interest to the user. For example, the content access authorization system 110 walks through a document graph to determine multiple candidate documents, utilizes multiple probabilistic data structures to quickly and efficiently filter out candidate documents for which the user does not have access permissions, and determines interest scores for the remaining documents for which the user has access rights. For instance, the recommended documents 424 display the three highest-ranked recommended documents determined for User 1.

As mentioned above, the graphical user interface 422 includes the recently accessed documents 426. As shown, the recently accessed documents 426 include a list of documents for which the user has recently accessed. In the illustrated implementation, the recently accessed documents 426 includes additional document information such as the document type, the document name, a time when the document was last accessed, and the user that last interacted with the document. In other implementations, the recently accessed documents 426 can include additional or alternative information corresponding to recently accessed documents for which User 1 has access rights.

Figure 5:
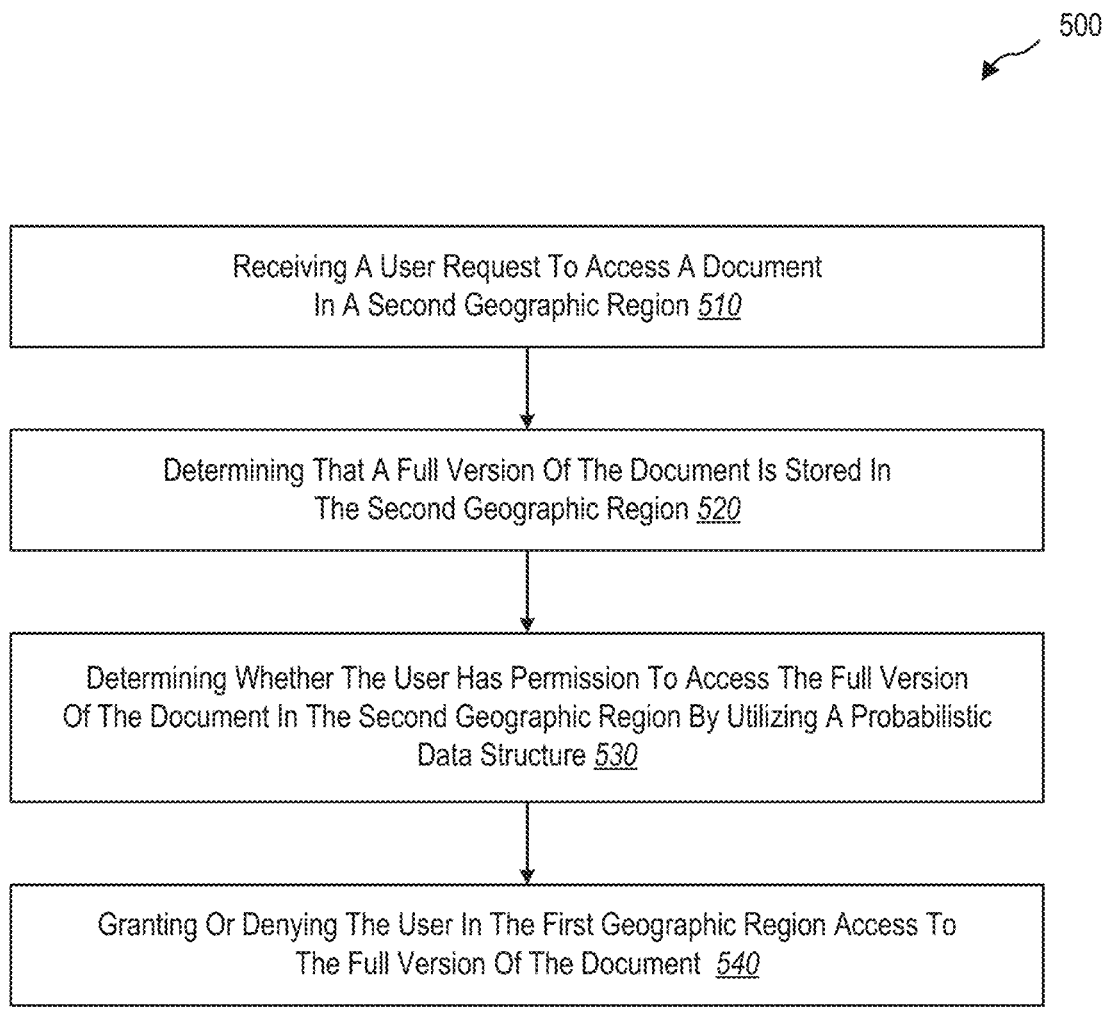
FIG. 5 illustrates an example series of acts of determining user access control information for digital documents in accordance with one or more implementations.

Turning now to FIG. 5, this figure illustrates example flowcharts including a series of acts 500 of determining user access control information for digital documents in accordance with one or more implementations. While FIG. 5 illustrates acts according to one or more implementations, alternative implementations may omit, add to, reorder, and/or modify any of the acts shown. Further, the acts of FIG. 5 can be performed as part of a method. Alternatively, a non-transitory computer-readable medium can include instructions that, when executed by one or more processors, cause a computing device to perform the acts of FIG. 5. In still further implementations, a system can perform the acts of FIG. 5.

As shown, the series of acts 500 includes an act 510 of receiving a user request to access a document in a second geographic region. For instance, the act 510 may include receiving a user request for a user in a first geographic region to access a digital document stored in a second geographic region. In one or more implementations, the second geographic region includes a data handling standard that prevents a user identifier of the user from being stored outside of the second geographic region.

In various implementations, the act 510 includes an access request query performed as a background process. In various implementations, the background process includes a plurality of access request queries requesting access to a plurality of digital documents stored in the second geographic region. In example implementations, one or more results of the plurality of access request queries are used to provide document insights to the user. In one or more implementations, the background process is an automation that is triggered based on a user visiting a webpage associated with the digital document. According to some implementations, a plurality of access request queries corresponds to traversing a graph that includes the plurality of digital documents.

As further shown, the series of acts 500 includes an act 520 of determining that a full version of the document is stored in the second geographic region. For example, the act 520 may involve determining, based on a shallow version of the digital document stored in the first geographic region, that a full version of the digital document is stored in the second geographic region. In some implementations, the shallow version of the digital document stored in the first geographic region includes metadata of the digital document including activity data indicating modifications to the digital document performed in both the first geographic region and the second geographic region.

As further shown, the series of acts 500 includes an act 530 of determining whether the user has permission to access the full version of the document in the second geographic region by utilizing a probabilistic data structure. For example, the act 530 may include determining, based on a shallow version of the digital document stored in the first geographic region, that a full version of the digital document is stored in the second geographic region. In some implementations, the act 530 includes determining whether the user has permission to access the full version of the digital document stored in the second geographic region by utilizing an access control probabilistic data structure that is stored in the first geographic region, where the access control probabilistic data structure removes user identities.

In some implementations, the act 530 includes determining that the user does not have permission to access the full version of the digital document stored in the second geographic region by utilizing an access control probabilistic data structure that is stored in the first geographic region. In one or more implementations, the act 530 includes sending a query from the first geographic region to the second geographic region for the user to access the full version of the digital document stored in the second geographic region based on the determination that the user satisfies the access control threshold.

In one or more implementations, the act 530 includes utilizing, within the first geographic region, the access control probabilistic data structure to determine that the user does not have permission to access the full version of the digital document stored in the second geographic region. In various implementations, the act 530 includes utilizing the access control probabilistic data structure to determine that the user does not have permission to access the full version of the digital document stored in the second geographic region by converting a user identifier for the user into a number that falls within a number range of the access control probabilistic data structure, and determining that an entry in the access control probabilistic data structure corresponding to the number does not satisfy an access control threshold.

In some implementations, the act 530 of determining whether the user has permission to access the full version of the digital document stored in the second geographic region can include utilizing, within the first geographic region, the access control probabilistic data structure to determine that the user satisfies an access control threshold. In additional implementations, the act 530 can include sending a query from the first geographic region to the second geographic region based on determining that the user satisfies an access control threshold with the access control probabilistic data structure in the first geographic region and receiving, from the second geographic region, an indication granting or denying the user in the first geographic region access to the full version of the digital document stored in the second geographic region.

Additionally, the act 530 can include receiving, from the second geographic region and at the first geographic region, the access control probabilistic data structure. In example implementations, the access control probabilistic data structure corresponds to permissions associated with the digital document. In certain implementations, the access control probabilistic data structure does not include a user identifier of the user. Further, the second geographic region includes an access control block associated with the digital document that includes the user identifier and corresponding user permission granting the user within the first geographic region access to the full version of the digital document stored in the second geographic region.

Additionally, in various implementations, the act 530 can include determining that the user belongs to a group. In various implementations, determining whether the user has permission to access the full version of the digital document stored in the second geographic region includes utilizing a label of the group with the access control probabilistic data structure to determine whether the user has permission to access the full version of the digital document stored in the second geographic region. In various implementations, the access control probabilistic data structure includes a bloom filter. In some implementations, the access control probabilistic data structure includes a cuckoo filter, a ribbon filter, or a xor filter.

As further shown, the series of acts 500 includes an act 540 of granting or denying the user in the first geographic region access to the full version of the document. For example, the act 540 may involve granting or denying the user in the first geographic region access to the full version of the digital document stored in the second geographic region based on the determination from the access control probabilistic data structure. In one or more implementations, the act 540 includes denying the user in the first geographic region access to the full version of the digital document stored in the second geographic region based on the determination from the access control probabilistic data structure.

In some implementations, the act includes receiving from the second geographic region, an indication denying the user in the first geographic region access to the full version of the digital document stored in the second geographic region and/or denying the user in the first geographic region access to the full version of the digital document stored in the second geographic region based on the indication received from the second geographic region. In example implementations, the act 540 includes denying the user in the first geographic region access to the full version of the digital document stored in the second geographic region based on determining that the user does not have permission to access the full version of the digital document stored in the second geographic region.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmission media can include a network and/or data links that can be used to carry needed program code means in the form of computer-executable instructions or data structures and which can be accessed by a general-purpose or special-purpose computer. Combinations of the above should also be included within the scope of computer-readable media.

In addition, the network described herein may represent a network or collection of networks (such as the Internet, a corporate intranet, a virtual private network (VPN), a local area network (LAN), a wireless local area network (WLAN), a cellular network, a wide area network (WAN), a metropolitan area network (MAN), or a combination of two or more such networks) over which one or more computing devices may access the content access authorization system 110. Indeed, the networks described herein may include one or multiple networks that use one or more communication platforms or technologies for transmitting data. For example, a network may include the Internet or other data link that enables transporting electronic data between respective client devices and components (e.g., server devices and/or virtual machines thereon) of the cloud-computing system.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (NIC), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions include, for example, instructions and data that, when executed by a processor, cause a general-purpose computer, special purpose computer, or special purpose processing device to perform a certain function or group of functions. In some implementations, computer-executable instructions are executed by a general-purpose computer to turn the general-purpose computer into a special-purpose computer implementing elements of the disclosure. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Figure 6:
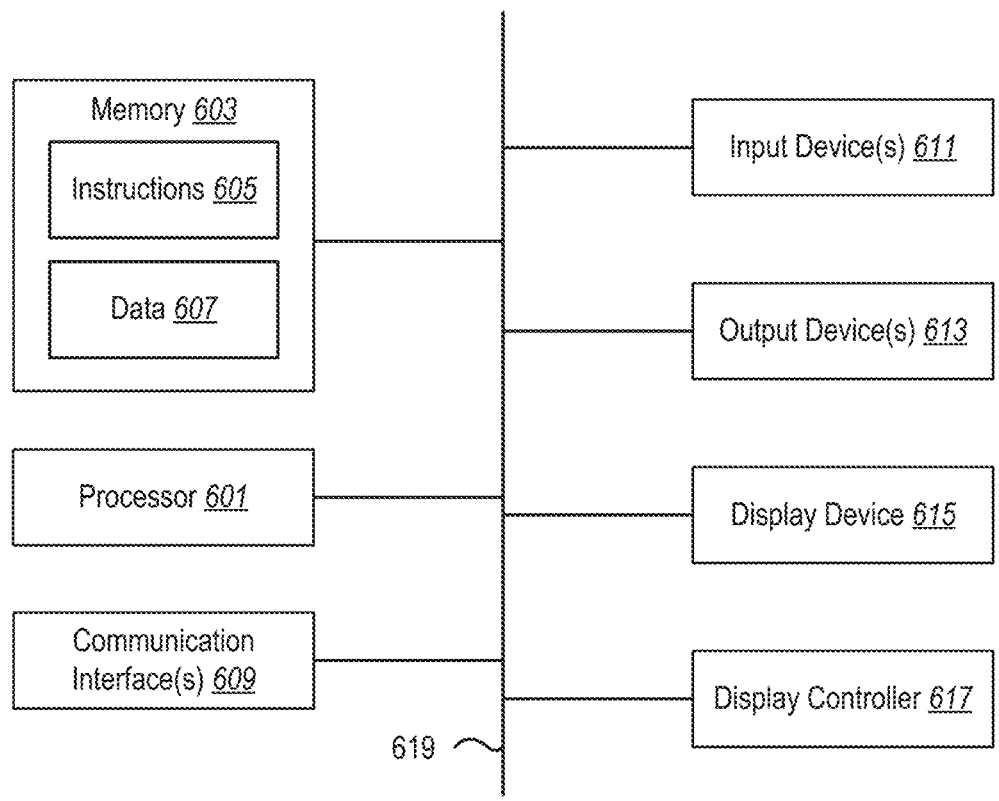
FIG. 6 illustrates certain components that may be included within a computer system.

FIG. 6 illustrates certain components that may be included within a computer system 600. The computer system 600 may be used to implement the various computing devices, components, and systems described herein.

In various implementations, the computer system 600 may represent one or more of the client devices, server devices, or other computing devices described above. For example, the computer system 600 may refer to various types of network devices capable of accessing data on a network, a cloud-computing system, or another system. For instance, a client device may refer to a mobile device such as a mobile telephone, a smartphone, a personal digital assistant (PDA), a tablet, a laptop, or a wearable computing device (e.g., a headset or smartwatch). A client device may also refer to a non-mobile device such as a desktop computer, a server node (e.g., from another cloud-computing system), or another non-portable device.

The computer system 600 includes a processor 601. The processor 601 may be a general-purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although the processor 601 shown is just a single processor in the computer system 600 of FIG. 6, in an alternative configuration, a combination of processors (e.g., an ARM and DSP) could be used.

The computer system 600 also includes memory 603 in electronic communication with the processor 601. The memory 603 may be any electronic component capable of storing electronic information. For example, the memory 603 may be embodied as random-access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

The instructions 605 and the data 607 may be stored in the memory 603. The instructions 605 may be executable by the processor 601 to implement some or all of the functionality disclosed herein. Executing the instructions 605 may involve the use of the data 607 that is stored in the memory 603. Any of the various examples of modules and components described herein may be implemented, partially or wholly, as instructions 605 stored in memory 603 and executed by the processor 601. Any of the various examples of data described herein may be among the data 607 that is stored in memory 603 and used during the execution of the instructions 605 by the processor 601.

A computer system 600 may also include one or more communication interface(s) 609 for communicating with other electronic devices. The one or more communication interface(s) 609 may be based on wired communication technology, wireless communication technology, or both. Some examples of the one or more communication interface(s) 609 include a Universal Serial Bus (USB), an Ethernet adapter, a wireless adapter that operates in accordance with an Institute of Electrical and Electronics Engineers (IEEE) 602.11 wireless communication protocol, a Bluetooth® wireless communication adapter, and an infrared (IR) communication port.

A computer system 600 may also include one or more input device(s) 611 and one or more output device(s) 613. Some examples of the one or more input device(s) 611 include a keyboard, mouse, microphone, remote control device, button, joystick, trackball, touchpad, and light pen. Some examples of the one or more output device(s) 613 include a speaker and a printer. A specific type of output device that is typically included in a computer system 600 is a display device 615. The display device 615 used with implementations disclosed herein may utilize any suitable image projection technology, such as liquid crystal display (LCD), light-emitting diode (LED), gas plasma, electroluminescence, or the like. A display controller 617 may also be provided, for converting data 607 stored in the memory 603 into text, graphics, and/or moving images (as appropriate) shown on the display device 615.

The various components of the computer system 600 may be coupled together by one or more buses, which may include a power bus, a control signal bus, a status signal bus, a data bus, etc. For the sake of clarity, the various buses are illustrated in FIG. 6 as a bus system 619.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The techniques described herein may be implemented in hardware, software, firmware, or any combination thereof unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium including instructions that, when executed by at least one processor, perform one or more of the methods described herein. The instructions may be organized into routines, programs, objects, components, data structures, etc., which may perform particular tasks and/or implement particular data types, and which may be combined or distributed as desired in various implementations.

Computer-readable media can be any available media that can be accessed by a general-purpose or special-purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can include at least two distinctly different kinds of computer-readable media: non-transitory computer-readable storage media (devices) and transmission media.

As used herein, non-transitory computer-readable storage media (devices) may include RAM, ROM, EEPROM, CD-ROM, solid-state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general-purpose or special-purpose computer.

The steps and/or actions of the methods described herein may be interchanged with one another without departing from the scope of the claims. In other words, unless a specific order of steps or actions is required for the proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database, or another data structure), ascertaining and the like. Also, "determining" can include receiving (e.g., receiving information), accessing (e.g., accessing data in a memory), and the like. Also, "determining" can include resolving, selecting, choosing, establishing, and the like.

The terms "comprising," "including," and "having" are intended to be inclusive and mean that there may be additional elements other than the listed elements. Additionally, it should be understood that references to "one implementation" or "implementations" of the present disclosure are not intended to be interpreted as excluding the existence of additional implementations that also incorporate the recited features. For example, any element or feature described concerning an implementation herein may be combinable with any element or feature of any other implementation described herein, where compatible.

The present disclosure may be embodied in other specific forms without departing from its spirit or characteristics. The described implementations are to be considered illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A computer-implemented method of determining user access control information for digital documents comprising:
    receiving a user request for a user in a first geographic region to access a digital document stored in a second geographic region;
    determining, based on a shallow version of the digital document stored in the first geographic region, that a full version of the digital document is stored in the second geographic region;
    determining whether the user has permission to access the full version of the digital document stored in the second geographic region by utilizing an access control probabilistic data structure that is stored in the first geographic region, wherein the access control probabilistic data structure removes user identities; and
    granting or denying the user in the first geographic region access to the full version of the digital document stored in the second geographic region based on the determination from the access control probabilistic data structure.

2. The computer-implemented method of claim 1, wherein:
    determining whether the user has permission to access the full version of the digital document stored in the second geographic region comprises utilizing, within the first geographic region, the access control probabilistic data structure to determine that the user does not have permission to access the full version of the digital document stored in the second geographic region; and granting or denying the user in the first geographic region access to the full version of the digital document stored in the second geographic region comprises denying the user in the first geographic region access to the full version of the digital document stored in the second geographic region based on determining that the user does not have permission to access the full version of the digital document stored in the second geographic region.

3. The computer-implemented method of claim 1, wherein the second geographic region comprises a data handling standard that prevents a user identifier of the user from being stored outside of the second geographic region.

4. The computer-implemented method of claim 1, further comprising utilizing the access control probabilistic data structure to determine that the user does not have permission to access the full version of the digital document stored in the second geographic region by:
   encoding a user identifier for the user into a number that falls within a number range of the access control probabilistic data structure; and
   determining that an entry in the access control probabilistic data structure corresponding to the number does not satisfy an access control threshold.

5. The computer-implemented method of claim 1, wherein determining whether the user has permission to access the full version of the digital document stored in the second geographic region comprises utilizing, within the first geographic region, the access control probabilistic data structure to determine that the user satisfies an access control threshold.

6. The computer-implemented method of claim 5, further comprising:
   sending a query from the first geographic region to the second geographic region based on determining that the user satisfies an access control threshold with the access control probabilistic data structure in the first geographic region; and
   receiving, from the second geographic region, an indication granting or denying the user in the first geographic region access to the full version of the digital document stored in the second geographic region.

7. The computer-implemented method of claim 6, further comprising receiving, from the second geographic region and at the first geographic region, the access control probabilistic data structure, wherein the access control probabilistic data structure corresponds to permissions associated with the digital document, and wherein the access control probabilistic data structure does not include a user identifier of the user.

8. The computer-implemented method of claim 7, wherein the second geographic region comprises an access control block associated with the digital document that includes the user identifier and corresponding user permission granting the user within the first geographic region access to the full version of the digital document stored in the second geographic region.

9. The computer-implemented method of claim 1, wherein the access control probabilistic data structure comprises a bloom filter.

10. The computer-implemented method of claim 1, wherein the access control probabilistic data structure comprises a cuckoo filter, a ribbon filter, or a xor filter.

11. The computer-implemented method of claim 1, further comprising:
   determining that the user belongs to a group; and
   wherein determining whether the user has permission to access the full version of the digital document stored in the second geographic region comprises utilizing a label of the group with the access control probabilistic data structure to determine whether the user has permission to access the full version of the digital document stored in the second geographic region.

12. A computer-implemented method of determining user access control information for digital documents comprising:
   receiving a user request for a user in a first geographic region to access a digital document stored in a second geographic region;
   determining, based on a shallow version of the digital document stored in the first geographic region, that a full version of the digital document is stored in the second geographic region;
   utilizing an access control probabilistic data structure that is stored in the first geographic region to determine that the user satisfies an access control threshold, wherein the access control probabilistic data structure removes user identities;
   based on the determination that the user satisfies the access control threshold, sending a query from the first geographic region to the second geographic region for the user to access the full version of the digital document stored in the second geographic region;
   receiving from the second geographic region, an indication denying the user in the first geographic region access to the full version of the digital document stored in the second geographic region; and
   denying the user in the first geographic region access to the full version of the digital document stored in the second geographic region based on the indication received from the second geographic region.

13. The computer-implemented method of claim 12, wherein the user request for the user in the first geographic region to access the full version of the digital document stored in the second geographic region comprises an access request query performed as a background process.

14. The computer-implemented method of claim 13, wherein:
   the background process comprises a plurality of access request queries requesting access to a plurality of digital documents stored in the second geographic region; and
   one or more results of the plurality of access request queries are used to provide document insights to the user.

15. The computer-implemented method of claim 14, wherein the plurality of access request queries corresponds to traversing a graph that comprises the plurality of digital documents.

16. The computer-implemented method of claim 13, wherein the background process is an automation that is triggered based on a user visiting a webpage associated with the digital document.

17. The computer-implemented method of claim 12, wherein the shallow version of the digital document stored in the first geographic region includes metadata of the digital document comprising activity data indicating modifications to the digital document performed in both the first geographic region and the second geographic region.

18. A system, comprising:
at least one processor; and
a non-transitory computer memory comprising instructions that, when executed by the at least one processor, cause the system to:
  receive a user request for a user in a first geographic region to access a digital document stored in a second geographic region;
  determining, based on a shallow version of the digital document stored in the first geographic region, that a full version of the digital document is stored in the second geographic region;
  determining that the user does not have permission to access the full version of the digital document stored in the second geographic region by utilizing an access control probabilistic data structure that is stored in the first geographic region, wherein the access control probabilistic data structure removes user identities; and
  denying the user in the first geographic region access to the full version of the digital document stored in the second geographic region based on the determination from the access control probabilistic data structure.

19. The system of claim 18, wherein the access control probabilistic data structure comprises a bloom filter.

20. The system of claim 18, wherein the user request for the user in the first geographic region to access the full version of the digital document stored in the second geographic region comprises an access request query performed as a background process.

* * * * *